(12) United States Patent
Ochiai et al.

(10) Patent No.: US 7,828,094 B2
(45) Date of Patent: Nov. 9, 2010

(54) DRIVING SYSTEM, CONTROL METHOD OF DRIVING SYSTEM, AND VEHICLE EQUIPPED WITH DRIVING SYSTEM

(75) Inventors: Kiyoe Ochiai, Nagoya (JP); Takehiro Koga, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 41 days.

(21) Appl. No.: 12/361,912

(22) Filed: Jan. 29, 2009

(65) Prior Publication Data

US 2009/0198439 A1    Aug. 6, 2009

(30) Foreign Application Priority Data

Jan. 31, 2008    (JP) ............................. 2008-020594

(51) Int. Cl.
*B60W 20/00* (2006.01)
(52) U.S. Cl. .............................. 180/65.28; 180/65.265; 180/65.29
(58) Field of Classification Search .............. 180/65.28, 180/65.275, 65.27; 701/114
See application file for complete search history.

(56) References Cited

FOREIGN PATENT DOCUMENTS

| JP | 11247701 A | 9/1999 |
|---|---|---|
| JP | 2005048595 | 2/2005 |
| JP | 2005343458 A | 12/2005 |
| JP | 2006348778 | 12/2006 |

*Primary Examiner*—Paul N Dickson
*Assistant Examiner*—Katy Meyer
(74) *Attorney, Agent, or Firm*—Gifford, Krass, Sprinkle, Anderson & Citkowski, P.C.

(57) ABSTRACT

A driving system, vehicle, and control method in which a difference between the detection value of an intake air pressure sensor and an atmospheric pressure sensor is computed as a detection value difference in the engine stop condition. An estimate of a potential for an abnormality of the detection value difference is determined, or the abnormality of the detection value difference is determined according to the duration time of an unusual state having the detection value difference of greater than a preset reference value. In an ignition-on state, when a delayed activation is requested, it is identified whether the abnormality in the detection value difference is to be determined. The delayed activation is requested in response to confirmation of a potential abnormality condition where there is a potential for an abnormality in the detection value difference but the abnormality in the detection value difference is not determined.

14 Claims, 7 Drawing Sheets

DRIVING SYSTEM, CONTROL METHOD OF DRIVING SYSTEM, AND VEHICLE EQUIPPED WITH DRIVING SYSTEM

BACKGROUND OF THE INVENTION

1. Field of the Invention

The present invention relates to a driving system, a control method of the driving system, and a vehicle equipped with the driving system.

2. Description of the Prior Art

One proposed structure of a driving system compares the detection value of an upstream intake air pressure sensor located in the upstream of a throttle valve with the detection value of a downstream intake air pressure sensor located in the downstream of the throttle valve and the detection value of an atmospheric pressure sensor in an engine stop condition and identifies the presence or the absence of any abnormality in the three pressure sensors (see, for example, Japanese Patent Laid-Open No. 2006-348778). The driving system of this prior art structure compares the detection values of the three pressure sensors and identifies the presence or the absence of any abnormality in the three pressure sensors by taking into account the fact that the internal pressure of an air intake conduit is substantially equal to the atmospheric pressure in the engine stop condition.

SUMMARY OF THE INVENTION

In a driving system equipped with a drive assembly including an engine and a motor and enabling output of power to a driveshaft with intermittent operation of the engine, an intake air pressure sensor, and an atmospheric pressure sensor, a difference between the detection value of the intake air pressure sensor and the detection value of the atmospheric pressure sensor is computed as a detection value difference in the engine stop condition. The driving system may estimate a potential for an abnormality of the detection value difference and determine the abnormality of the detection value difference in a stepwise manner according to the duration time of an unusual state having the detection value difference of greater than a preset reference value. According to the engine stop time, there may be a case of succeeding in estimating a potential for an abnormality of the detection value difference but failing to determine the abnormality of the detection value difference.

In the driving system, the control method of the driving system, and the vehicle equipped with the driving system, there would be a demand for ensuring an opportunity for identifying whether an abnormality in a detection value difference is to be determined when there is a potential for abnormality in the detection value difference given as a difference between an observed atmospheric pressure or an atmospheric pressure detected by an atmospheric pressure detector and an observed intake air pressure or an intake air pressure detected by an intake air pressure detector.

The present invention accomplishes at least part of the demand mentioned above and the other relevant demands by the following configurations applied to the driving system, the control method of the driving system, and the vehicle equipped with the driving system.

The present invention is directed to a driving system which includes: a drive assembly constructed to include an internal combustion engine and a motor and to output power to a driveshaft with intermittent operation of the internal combustion engine; an atmospheric pressure detector designed to detect an atmospheric pressure; an intake air pressure detector designed to detect an intake air pressure or a pressure of intake air of the internal combustion engine; an abnormality potential estimation module configured to estimate a potential for abnormality of a detection value difference, which is a difference between an observed atmospheric pressure as the atmospheric pressure detected by the atmospheric pressure detector and an observed intake air pressure as the intake air pressure detected by the intake air pressure detector, when an unusual state, in which the detection value difference is greater than a preset reference value, continues for at least a preset first time period in an isobaric condition where the intake air pressure is substantially equal to the atmospheric pressure; an abnormality determination module configured to determine an abnormality of the detection value difference when the unusual state continues for at least a preset second time period, which is longer than the preset first time period; and an unusual state duration identification module configured to determine whether the unusual state continues for at least the preset second time period prior to a restart of the internal combustion engine after an activation stop instruction of the driving system, upon confirmation of a potential abnormality condition where the potential for abnormality of the detection value difference is estimated by the abnormality potential estimation module but the abnormality of the detection value difference is not determined by the abnormality determination module.

The driving system according to this aspect of the invention estimates a potential for abnormality of the detection value difference given as the difference between the observed atmospheric pressure or the atmospheric pressure detected by the atmospheric pressure detector and the observed intake air pressure or the intake air pressure detected by the intake air pressure detector, when the unusual state having the detection value difference of greater than the preset reference value continues for at least the preset first time period in the isobaric condition where the intake air pressure is substantially equal to the atmospheric pressure. The driving system of the invention determines the abnormality of the detection value difference when the unusual state continues for at least the preset second time period that is longer than the preset first time period. The driving system of the invention determines whether the unusual state continues for at least the preset second time period prior to a restart of the internal combustion engine after an activation stop instruction of the driving system, upon confirmation of the potential abnormality condition where the potential for abnormality of the detection value difference is estimated but the abnormality of the detection value difference is not determined. Namely upon confirmation of the potential abnormality condition, it is identified whether the abnormality of the detection value difference is to be determined prior to a restart of the internal combustion engine after an activation stop instruction of the driving system. This arrangement effectively ensures the opportunity for identifying whether the abnormality of the detection value difference is to be determined when there is a potential for the abnormality of the detection value difference.

In one preferable application of the driving system according to the above aspect of the invention, upon confirmation of the potential abnormality condition, the unusual state duration identification module may determine whether the unusual state continues for at least the preset second time period prior to activation of the driving system, in response to a system activation instruction after an activation stop of the driving system. In the driving system, upon confirmation of the potential abnormality condition, the unusual state duration identification module may determine whether the unusual state continues for at least the preset second time period at an activation stop time of the driving system.

In one preferable application of the driving system of the present invention, unusual state duration identification module may confirm the potential abnormality condition in response to detection of the potential abnormality condition at least a preset number of times.

In another preferable application of the driving system according to the above aspect of the invention, the isobaric condition is either a continuous rotation stop state where rotation of the internal combustion engine stops for at least a preset third time period or a continuous high throttle opening state where a throttle opening of the internal combustion engine is within a predetermined high throttle opening range for at least a preset fourth time period. In this application, the reference value may be set to a larger value in the continuous high throttle opening state than a set value in the continuous rotation stop state. This is because the observed intake air pressure is readily changed by a slight variation in throttle opening or according to the operating condition of the internal combustion engine in the continuous high throttle opening state, compared in the continuous rotation stop state.

In the driving system of the present invention, the drive assembly may further include an accumulator and a high voltage-system voltage regulator linked to a low voltage system connecting with the accumulator and to a high voltage system connecting with a driving circuit of the motor and configured to regulate a voltage in the high voltage system, the driving system further having: a booster controller configured to control the high voltage-system voltage regulator upon no determination of the abnormality of the detection value difference by the abnormality determination module, in order to regulate the voltage in the high voltage system to a specific voltage based on the observed atmospheric pressure, and to control the high voltage-system voltage regulator upon determination of the abnormality of the detection value difference by the abnormality determination module, in order to regulate the voltage in the high voltage system to a lower voltage that is less than the specific voltage.

In one preferable application of the driving system according to the above aspect of the invention, the drive assembly may further include an electric power-mechanical power input output assembly connected with the driveshaft and with an output shaft of the internal combustion engine in such a manner as to be rotatable independently of the driveshaft and configured to input and output power to and from the driveshaft and the output shaft through input and output of electric power and mechanical power. In the driving system, the electric power-mechanical power input output assembly may have a generator designed to input and output power; and a three shaft-type power input output structure connected to three shafts, the driveshaft, the output shaft of the internal combustion engine, and a rotating shaft of the generator, and designed to input and output power to a residual shaft based on powers input from and output to any two shafts among the three shafts.

The present invention is directed to a vehicle which includes: a drive assembly constructed to include an internal combustion engine and a motor and to output power to a driveshaft linked to an axle of the vehicle with intermittent operation of the internal combustion engine; an atmospheric pressure detector designed to detect an atmospheric pressure; an intake air pressure detector designed to detect an intake air pressure or a pressure of intake air of the internal combustion engine; an abnormality potential estimation module configured to estimate a potential for abnormality of a detection value difference, which is a difference between an observed atmospheric pressure as the atmospheric pressure detected by the atmospheric pressure detector and an observed intake air pressure as the intake air pressure detected by the intake air pressure detector, when an unusual state, in which the detection value difference is greater than a preset reference value, continues for at least a preset first time period in an isobaric condition where the intake air pressure is substantially equal to the atmospheric pressure; an abnormality determination module configured to determine an abnormality of the detection value difference when the unusual state continues for at least a preset second time period, which is longer than the preset first time period; and an unusual state duration identification module configured to determine whether the unusual state continues for at least the preset second time period prior to a restart of the internal combustion engine after an activation stop instruction of a driving system of the vehicle, upon confirmation of a potential abnormality condition where the potential for abnormality of the detection value difference is estimated by the abnormality potential estimation module but the abnormality of the detection value difference is not determined by the abnormality determination module.

The vehicle according to this aspect of the invention is equipped with the driving system of the invention having any of the configurations and arrangements explained above. The vehicle of the invention accordingly has the similar effects to those of the driving system discussed above, for example, the effect of ensuring the opportunity for identifying whether the abnormality of the detection value difference is to be determined when there is a potential for the abnormality of the detection value difference.

The present invention is directed to a control method of a driving system which includes: a drive assembly constructed to include an internal combustion engine and a motor and to output power to a driveshaft with intermittent operation of the internal combustion engine; an atmospheric pressure detector designed to detect an atmospheric pressure; and an intake air pressure detector designed to detect an intake air pressure or a pressure of intake air of the internal combustion engine, the control method comprising the steps of:

(a) estimating a potential for abnormality of a detection value difference, which is a difference between an observed atmospheric pressure as the atmospheric pressure detected by the atmospheric pressure detector and an observed intake air pressure as the intake air pressure detected by the intake air pressure detector, when an unusual state, in which the detection value difference is greater than a preset reference value, continues for at least a preset first time period in an isobaric condition where the intake air pressure is substantially equal to the atmospheric pressure;

(b) determining an abnormality of the detection value difference when the unusual state continues for at least a preset second time period, which is longer than the preset first time period; and (c) determining whether the unusual state continues for at least the preset second time period prior to a restart of the internal combustion engine after an activation stop instruction of the driving system, upon confirmation of a potential abnormality condition where the potential for abnormality of the detection value difference is estimated in the step (a) but the abnormality of the detection value difference is not determined in the step (b).

The control method of the driving system according to this aspect of the invention estimates a potential for abnormality of the detection value difference given as the difference between the observed atmospheric pressure or the atmospheric pressure detected by the atmospheric pressure detector and the observed intake air pressure or the intake air pressure detected by the intake air pressure detector, when the unusual state having the detection value difference of greater than the preset reference value continues for at least the preset first time period in the isobaric condition where the intake air pressure is substantially equal to the atmospheric pressure. The control method determines the abnormality of the detection value difference when the unusual state continues for at least the preset second time period that is longer than the preset first time period. The control method determines whether the unusual state continues for at least the preset second time period prior to a restart of the internal combustion engine after an activation stop instruction of the driving system, upon confirmation of the potential abnormality condition where the potential for abnormality of the detection value difference is estimated but the abnormality of the detection value difference is not determined. Namely upon confirmation of the potential abnormality condition, it is identified whether the abnormality of the detection value difference is to be determined prior to a restart of the internal combustion engine after an activation stop instruction of the driving system. This arrangement effectively ensures the opportunity for identifying whether the abnormality of the detection value difference is to be determined when there is a potential for the abnormality of the detection value difference.

In one preferable application of the control method of the driving system of the present invention, upon confirmation of the potential abnormality condition, the step (c) may determine whether the unusual state continues for at least the preset second time period prior to activation of the driving system, in response to a system activation instruction after an activation stop of the driving system. In the control method of the driving system, upon confirmation of the potential abnormality condition, the step (c) may determine whether the unusual state continues for at least the preset second time period at an activation stop time of the driving system.

In the control method of the driving system, the step (c) may confirm the potential abnormality condition in response to detection of the potential abnormality condition at least a preset number of times.

DESCRIPTION OF THE PREFERRED EMBODIMENTS

Figure 1:
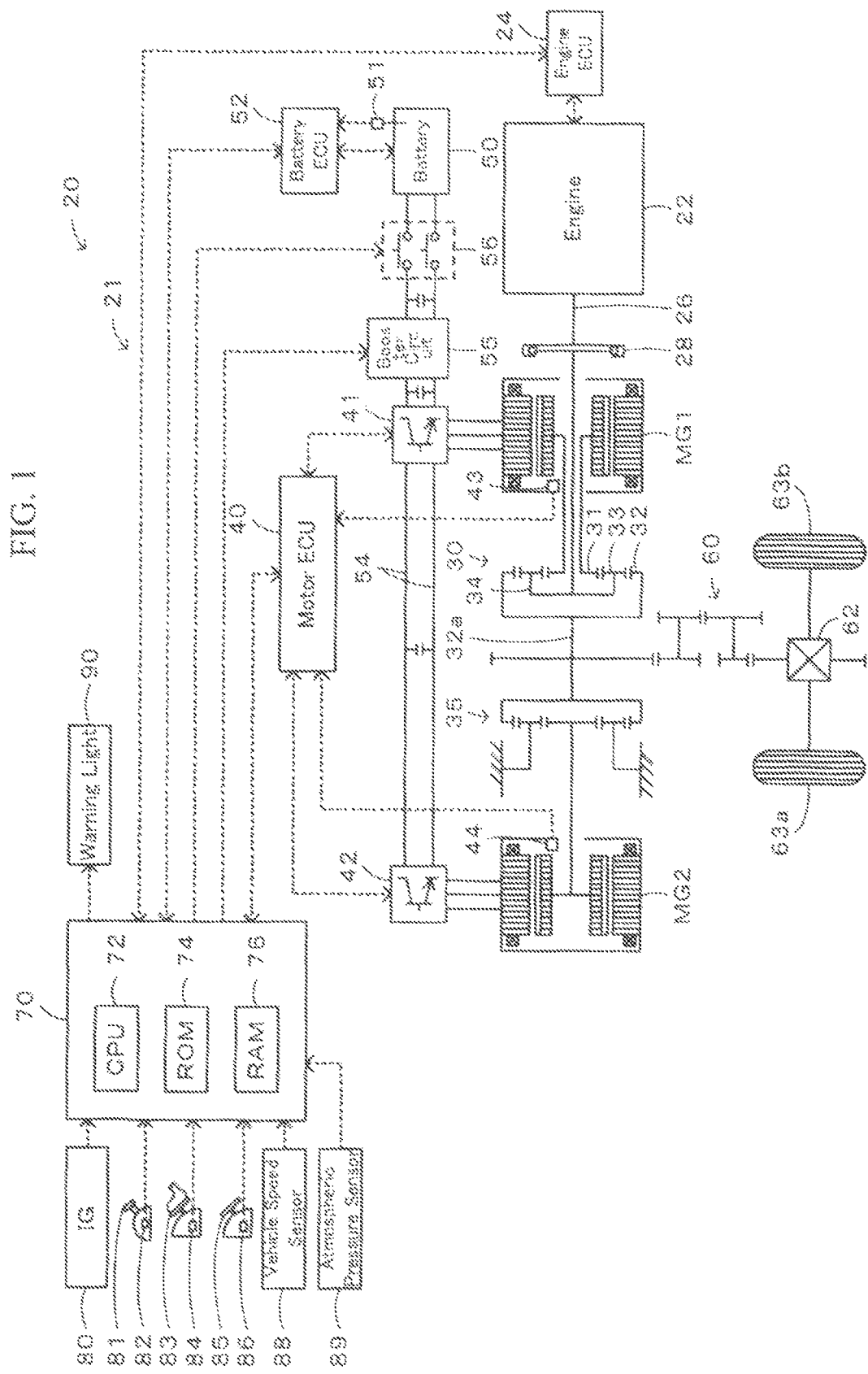
FIG. 1 schematically illustrates the configuration of a hybrid vehicle 20 equipped with a driving system in one embodiment of the invention.

One mode of carrying out the invention is described below as a preferred embodiment with reference to the accompanied drawings. FIG. 1 schematically illustrates the configuration of a hybrid vehicle 20 equipped with a driving system 21 in one embodiment of the invention. As illustrated, the hybrid vehicle 20 of the embodiment has the driving system 21 and a hybrid electronic control unit 70 configured to control the operations of the whole driving system 21. The driving system 21 includes an engine 22, a three shaft-type power distribution integration mechanism 30 connected via a damper 28 to a crankshaft 26 or an output shaft of the engine 22, a motor MG1 connected to the power distribution integration mechanism 30 and designed to have power generation capability, a reduction gear 35 attached to a ring gear shaft 32a or a driveshaft linked with the power distribution integration mechanism 30, a motor MG2 connected to the reduction gear 35, inverters 41 and 42 arranged to convert dc current into ac current and supply the ac current to the motors MG1 and MG2, a battery 50 designed to be chargeable and dischargeable, a booster circuit 55 configured to convert the voltage of electric power output from the battery 50 and supply the converted voltage to the inverters 41 and 42, and a system main relay 56 interposed between the battery 50 and the booster circuit 55.

Figure 2:
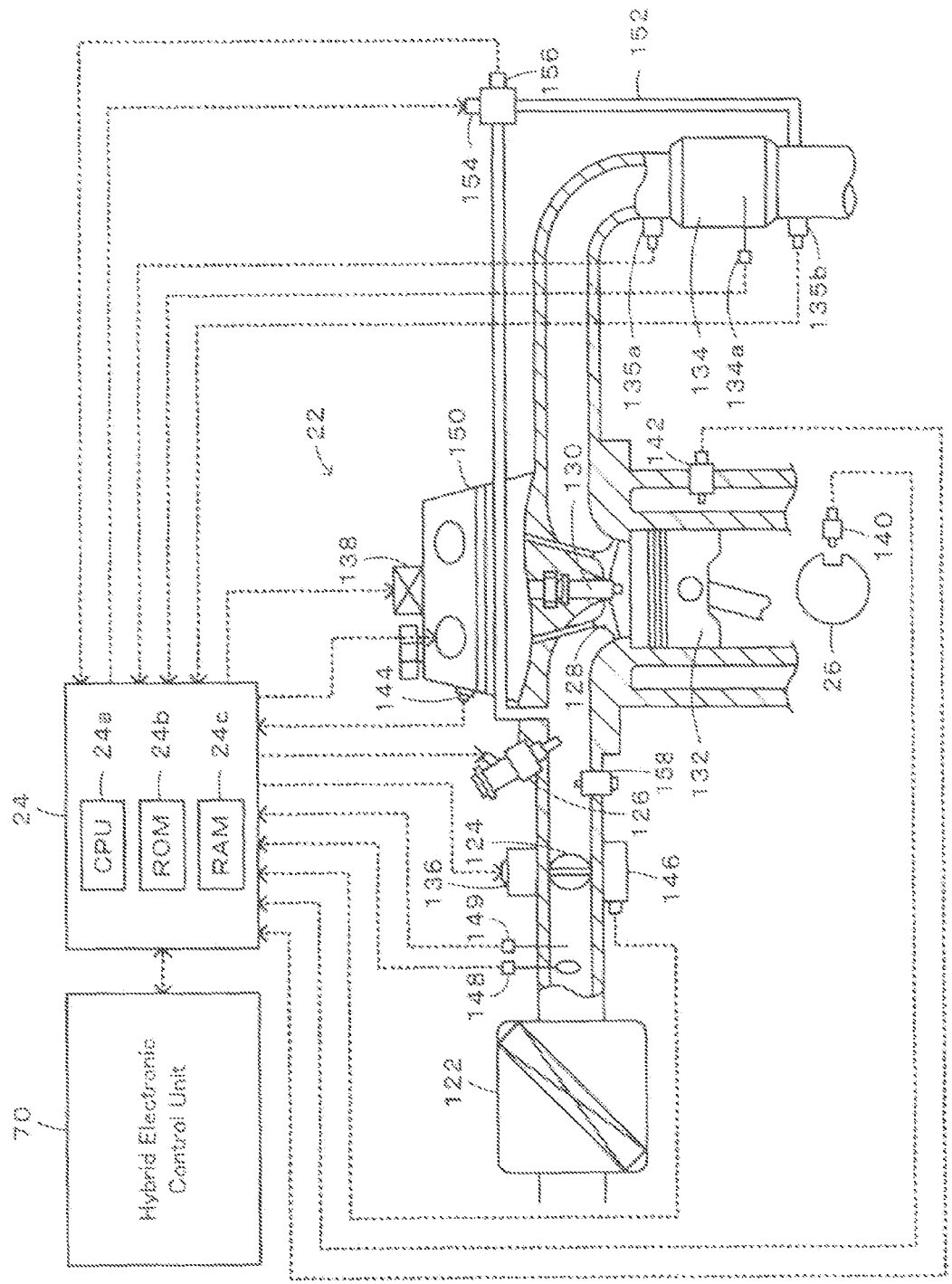
FIG. 2 shows the schematic structure of an engine 22 included in the driving system of the embodiment.

The engine 22 is constructed as an internal combustion engine designed to consume a hydrocarbon fuel, such as gasoline or light oil, and thereby generate power. As shown in FIG. 2, the air cleaned by an air cleaner 122 and taken in via a throttle valve 124 is mixed with the atomized fuel injected from a fuel injection valve 126 to the air-fuel mixture. The air-fuel mixture is introduced into a combustion chamber by means of an intake valve 128. The introduced air-fuel mixture is ignited with spark made by a spark plug 130 to be explosively combusted. The reciprocating motions of a piston 132 pressed down by the combustion energy are converted into rotational motions of the crankshaft 26. The exhaust from the engine 22 goes through a catalytic converter (three-way catalyst) 134 designed to convert toxic components included in the exhaust, that is, carbon monoxide (CO), hydrocarbons (HC), and nitrogen oxides (NOx), into harmless components and is discharged to the outside air. An EGR pipe 152 and an EGR valve 154 are provided after the catalytic converter 134. The EGR pipe 152 circulates the flow of the exhaust as an EGR gas to the air intake system, and the EGR valve 154 regulates the amount of the EGR gas circulated to the air intake system. In an open position of the EGR valve 154, the EGR gas containing uncombusted fuel gas is supplied to the air intake system and is introduced together with the air-fuel mixture into the combustion chamber in the engine 22.

The engine 22 is under control of an engine electronic control unit (hereafter referred to as engine ECU) 24. The engine ECU 24 is constructed as a microprocessor including a CPU 24a, a ROM 24b configured to store processing programs, a RAM 24c configured to temporarily store data, input and output ports (not shown), and a communication port (not shown). The engine ECU 24 receives, via its input port, signals from various sensors designed to measure and detect the operating conditions of the engine 22. The signals input into the engine ECU 24 include a crank position from a crank position sensor 140 detected as the rotational position of the crankshaft 26, a cooling water temperature from a water temperature sensor 142 measured as the temperature of cooling water in the engine 22, an in-cylinder pressure from a pressure sensor (not shown) provided in the combustion chamber, cam positions from a cam position sensor 144 detected as the rotational positions of camshafts driven to open and close the intake valve 128 and an exhaust valve for gas intake and exhaust into and from the combustion chamber, a throttle opening TH from a throttle valve position sensor 146 detected as the position of the throttle valve 124, an intake air amount Qa as the weight of the intake air flow from an air flow meter 148 provided in an air intake conduit, an intake air temperature from a temperature sensor 149 provided in the air intake conduit, an intake air pressure Pin from an intake air pressure sensor 158 measured as the internal pressure of the air intake conduit, an air-fuel ratio from an air fuel ratio sensor 135a, an oxygen signal from an oxygen sensor 135b, and an EGR gas temperature from a temperature sensor 156 measured as the temperature of the EGR gas in the EGR pipe 152. The engine ECU 24 outputs, via its output port, diverse control signals and driving signals to drive and control the engine 22. The signals output from the engine ECU 24 include driving signals to the fuel injection valve 126, driving signals to a throttle motor 136 driven to regulate the position of the throttle valve 124, control signals to an ignition coil 138 integrated with an igniter, control signals to a variable valve timing mechanism 150 to vary the open and close timings of the intake valve 128, and driving signals to the EGR valve 154 to regulate the amount of the EGR gas circulated to the air intake system. The engine ECU 24 establishes communication with the hybrid electronic control unit 70 to drive and control the engine 22 in response to control signals received from the hybrid electronic control unit 70 and to output data regarding the operating conditions of the engine 22 to the hybrid electronic control unit 70 according to the requirements. The engine ECU 24 also computes a rotation speed of the crankshaft 26, which is equivalent to a rotation speed Ne of the engine 22, based on the crank position from the crank positions sensor 140.

The power distribution integration mechanism 30 includes a sun gear 31 as an external gear, a ring gear 32 as an internal gear arranged concentrically with the sun gear 31, multiple pinion gears 33 arranged to engage with the sun gear 31 and with the ring gear 32, and a carrier 34 arranged to hold the multiple pinion gears 33 such as to allow both their revolutions and their rotations on their axes. The power distribution integration mechanism 30 is thus constructed as a planetary gear mechanism including the sun gear 31, the ring gear 32, and the carrier 34 as rotational elements of differential motions. The carrier 34, the sun gear 31, and the ring gear 32 of the power distribution integration mechanism 30 are respectively linked to the crankshaft 26 of the engine 22, to the motor MG1, and to the reduction gear 35 via the ring gear shaft 32a. When the motor MG1 functions as a generator, the power of the engine 22 input via the carrier 34 is distributed to the sun gear 31 and the ring gear 32 corresponding to their gear ratio. When the motor MG1 functions as a motor, on the other hand, the power of the engine 22 input via the carrier 34 is integrated with the power of the motor MG1 input via the sun gear 31 and is output to the ring gear 32. The power output to the ring gear 32 is transmitted from the ring gear shaft 32a through a gear mechanism 60 and a differential gear 62 and is eventually output to drive wheels 63a and 63b of the hybrid vehicle 20.

The motors MG1 and MG2 are constructed as known synchronous motor generators to enable operations as both a generator and a motor. The motors MG1 and MG2 transmit electric power to and from the battery 50 via the inverters 41 and 42 and the booster circuit 55. Power lines 54 connecting the inverters 41 and 42 with the booster circuit 55 are structured as common positive bus and negative bus shared by the inverters 41 and 42. Such connection enables electric power generated by one of the motors MG1 and MG2 to be consumed by the other motor MG2 or MG1. The battery 50 may thus be charged with surplus electric power generated by either of the motors MG1 and MG2 and converted by the booster circuit 55, while being discharged to supplement insufficient electric power via the booster circuit 55. The battery 50 is neither charged nor discharged upon the balance of the input and output of electric powers between the motors MG1 and MG2. Both the motors MG1 and MG2 are driven and controlled by a motor electronic control unit (hereafter referred to as motor ECU) 40. The motor ECU 40 inputs various signals required for driving and controlling the motors MG1 and MG2, for example, signals representing rotational positions of rotors in the motors MG1 and MG2 from rotational position detection sensors 43 and 44 and signals representing phase currents to be applied to the motors MG1 and MG2 from current sensors (not shown). The motor ECU 40 outputs switching control signals to the inverters 41 and 42. The motor ECU 40 establishes communication with the hybrid electronic control unit 70 to drive and control the motors MG1 and MG2 in response to control signals received from the hybrid electronic control unit 70 and to output data regarding the operating conditions of the motors MG1 and MG2 to the hybrid electronic control unit 70 according to the requirements. The motor ECU 40 also computes rotation speeds Nm1 and Nm2 of the motors MG1 and MG2 based on the output signals of the rotational position detection sensors 43 and 44.

The battery 50 is under control and management of a battery electronic control unit (hereafter referred to as battery ECU) 52. The battery ECU 52 inputs signals required for management and control of the battery 50, for example, an inter-terminal voltage from a voltage sensor (not shown) located between terminals of the battery 50, a charge-discharge current from a current sensor (not shown) located in the power line 54 connecting with an output terminal of the battery 50, and a battery temperature Tb from a temperature sensor 51 attached to the battery 50. The battery ECU 52 outputs data regarding the operating conditions of the battery 50 by communication to the hybrid electronic control unit 70 according to the requirements. The battery ECU 52 also performs various arithmetic operations for management and control of the battery 50. A remaining charge or state of charge SOC of the battery 50 is calculated from an integrated value of the charge-discharge current measured by the current sensor. An input limit Win as an allowable charging electric power to be charged in the battery 50 and an output limit Wout as an allowable discharging electric power to be discharged from the battery 50 are set corresponding to the calculated state of charge SOC and the battery temperature Tb. A concrete procedure of setting the input and output limits Win and Wout of the battery 50 sets base values of the input limit Win and the output limit Wout corresponding to the battery temperature Tb, specifies an input limit correction factor and an output limit correction factor corresponding to the state of charge SOC of the battery 50, and multiplies the base values of the input limit Win and the output limit Wout by the specified input limit correction factor and output limit correction factor to determine the input limit Win and the output limit Wout of the battery 50.

The hybrid electronic control unit 70 is constructed as a microcomputer including a CPU 72, a ROM 74 configured to store processing programs, a RAM 76 configured to temporarily store data, input and output ports (not shown), and a communication port (not shown). The hybrid electronic control unit 70 inputs, via its input port, an ignition signal from an ignition switch 80, a gearshift position SP or a current setting position of a gearshift lever 81 from a gearshift position sensor 82, an accelerator opening Acc or the driver's depression amount of an accelerator pedal 83 from an accelerator pedal position sensor 84, a brake pedal position BP or the driver's depression amount of a brake pedal 85 from a brake pedal position sensor 86, a vehicle speed V from a vehicle speed sensor 88, and an atmospheric pressure Pa from an atmospheric pressure sensor 89. The hybrid electronic control unit 70 outputs driving signals to the booster circuit 55, driving signals to the system main relay 56, and lighting signals to a warning light 90 via its output port. The hybrid electronic control unit 70 makes connection with the engine ECU 24, the motor ECU 40, and the battery ECU 52 via its communication port to transmit various control signals and data to and from the engine ECU 24, the motor ECU 40, and the battery ECU 52 as mentioned previously.

The hybrid vehicle 20 of the embodiment constructed as described above sets a torque demand, which is to be output to the ring gear shaft 32*a* or the driveshaft, based on the vehicle speed V and the accelerator opening Acc corresponding to the driver's depression amount of the accelerator pedal 83, and controls the operations of the engine 22 and the motors MG1 and MG2 to ensure output of a power demand equivalent to the preset torque demand to the ring gear shaft 32*a*. There are several drive control modes of the engine 22 and the motors MG1 and MG2. In a torque conversion drive mode, while the engine 22 is driven and controlled to ensure output of a power equivalent to the power demand, the motors MG1 and MG2 are driven and controlled to enable all the output power of the engine 22 to be subjected to torque conversion by the power distribution integration mechanism 30 and the motors MG1 and MG2 and to be output to the ring gear shaft 32*a*. In a charge-discharge drive mode, the engine 22 is driven and controlled to ensure output of a power corresponding to the sum of the power demand and an electric power required for charging the battery 50 or an electric power to be discharged from the battery 50. The motors MG1 and MG2 are driven and controlled to enable all or part of the output power of the engine 22 with charge or discharge of the battery 50 to be subjected to torque conversion by the power distribution integration mechanism 30 and the motors MG1 and MG2 and to ensure output of a power equivalent to the power demand to the ring gear shaft 32*a*. In a motor drive mode, the motor MG2 is driven and controlled to ensure output of a power equivalent to the power demand to the ring gear shaft 32*a*, while the engine 22 stops its operation. In the torque conversion drive mode and in the charge-discharge drive mode, the engine 22 and the motors MG1 and MG2 are controlled to ensure output of the power demand to the ring gear shaft 32*a* with the operation of the engine 22. There is accordingly no practical difference in control operations. In the description hereafter, the torque conversion drive mode and the charge-discharge drive mode are collectively referred to as the engine drive mode.

The hybrid vehicle 20 of the embodiment selectively drives in the engine drive mode, when the power equivalent to the sum of the power demand corresponding to the torque demand and the electric power required for charging the battery 50 or the electric power to be discharged from the battery 50 (that is, the power to be output from the engine 22, hereafter referred to as the engine target power) is not less than a specific power level in the vicinity of a lower limit of an efficient operation power range of ensuring efficient operation of the engine 22. The hybrid vehicle 20 of the embodiment selectively drives in the motor drive mode, when the engine target power is less than the specific power level. In response to an increase of the engine target power to or above the specific power level during a drive in the motor drive mode, the hybrid vehicle 20 starts the operation of the engine 22 and shifts the drive mode from the motor drive mode to the engine drive mode. In response to a decrease of the engine target power below the specific power level during a drive in the engine drive mode, on the contrary, the hybrid vehicle 20 stops the operation of the engine 22 and shifts the drive mode from the engine drive mode to the motor drive mode. The procedure of stopping the operation of the engine 22 stops fuel injection and ignition in the engine 22 and sets the throttle opening TH to 0 (fully closes the throttle valve 124) to stop the rotation of the engine 22. After the completed rotation stop of the engine 22, a throttle opening process is performed to set the throttle opening TH to a preset opening TH1 (for example, 0.5 degrees or 1.0 degree). The throttle opening process after the completed rotation stop of the engine 22 is performed to provide for a restart of the engine 22. The throttle opening process makes an actual intake air pressure Pinac substantially equal to an actual atmospheric pressure Paac.

The hybrid vehicle 20 of the embodiment sets a target voltage Vh* based on the torques output from the motors MG1 and MG2 and the atmospheric pressure Pa and drives and controls the booster circuit 55 with the set target voltage Vh* to regulate the voltage supplied to the inverters 41 and 42. The target voltage Vh* may be set with restriction of a limit value having a tendency of decreasing from a base value corresponding to the torques output from the motors MG1 and MG2 with a decrease in atmospheric pressure Pa. Setting the target voltage Vh* by taking into account the atmospheric pressure Pa aims to prevent dielectric breakdown of coils in the motors MG1 and MG2.

Figure 3:
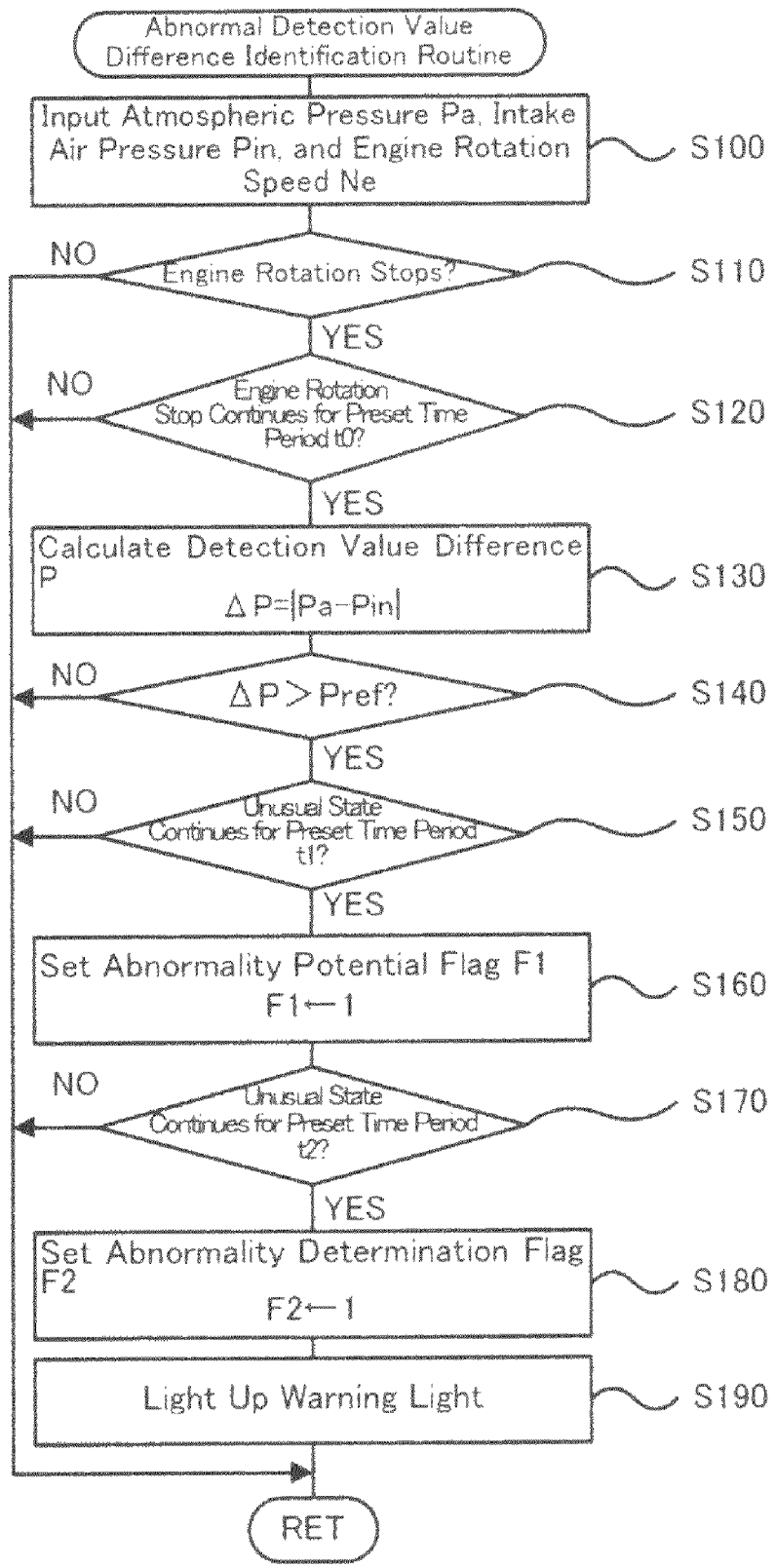
FIG. 3 is a flowchart showing an abnormal detection value difference identification routine executed by a hybrid electronic control unit 70 incorporated in the hybrid vehicle of the embodiment.

The following describes the operations of the hybrid vehicle 20 of the embodiment having the configuration discussed above. The description first regards an abnormal detection value difference identification process to identify an abnormality in a detection value difference between the detection value of the atmospheric pressure 89 and the detection value of the intake air pressure sensor 158. FIG. 3 is a flowchart showing an abnormal detection value difference identification routine executed by the hybrid electronic control unit 70 in the embodiment. This routine is repeatedly performed at preset time intervals, for example, at every several msec.

In the abnormal detection value difference identification routine, the CPU 72 of the hybrid electronic control unit 70 first inputs required data, that is, the atmospheric pressure Pa from the atmospheric pressure sensor 89, the intake air pressure Pin, and the rotation speed Ne of the engine 22 (step S100). The intake air pressure Pin is measured by the intake air pressure sensor 158 and is input from the engine ECU 24 by communication. The rotation speed Ne of the engine 22 is computed from the signal of the crank position sensor 140 and is input from the engine ECU 24 by communication.

After the data input, the CPU 72 determines whether the engine 22 is in a continuous rotation stop state where the rotation stop of the engine 22 continues for at least a preset time period t0, based on the input rotation speed Ne of the engine 22 (steps S110 and S120). The actual intake air pressure Pinac is significantly lower than the actual atmospheric pressure Paac during the operation of the engine 22 or immediately after a rotation stop of the engine 22. Namely the actual intake air pressure Pinac is not substantially equal to the actual atmospheric pressure Paac in these states. The procedure of the embodiment slightly opens the throttle valve 124 after the completed rotation stop of the engine 22. The slightly opened throttle valve 124 after the completed rotation stop of the engine 22 causes the actual intake air pressure Pinac to gradually approach and to be substantially equal to the actual atmospheric pressure Paac. The time period t0 is experimentally or otherwise determined as a time required for making the actual intake air pressure Pinac substantially equal to the actual atmospheric pressure Paac after the completed rotation stop of the engine 22 and is set equal to, for example, 5 sec or 7 sec. The processing of steps S110 and S120 determines whether the actual intake air pressure Pinac is expected to be substantially equal to the actual atmospheric pressure Paac. Upon determination of the non-continuous rotation stop state, the CPU 72 immediately exits from the abnormal detection value difference identification routine.

Upon determination of the continuous rotation stop state, on the other hand, the CPU 72 calculates an absolute value of a difference between the atmospheric pressure Pa and the intake air pressure Pin as a detection value difference ΔP (step S130) and compares the calculated detection value difference ΔP with a preset reference value Pref (step S140). The reference value Pref is used as a criterion for determining whether the detection value (atmospheric pressure Pa) of the atmospheric pressure sensor 89 and the detection value (intake air pressure Pin) of the intake air pressure sensor 158 are normal (within an allowable error range) and is determined according to the detection accuracies of the atmospheric pressure sensor 89 and the intake air pressure sensor 158. When the detection value difference ΔP is not greater than the preset reference value Pref at step S140, it is determined that the detection value (atmospheric pressure Pa) of the atmospheric pressure sensor 89 and the detection value (intake air pressure Pin) of the intake air pressure sensor 158 are normal. The CPU 72 then exits from the abnormal detection value difference identification routine.

When the detection value difference ΔP is greater than the preset reference value Pref at step S140, on the other hand, the CPU 72 subsequently determines whether the unusual state having the detection value difference ΔP of greater than the preset reference value Pref continues for at least a preset time period t1 (step S150). The time period t1 is used as a time required for detecting a potential for abnormality in the detection value difference ΔP and is set, for example, 400 msec or 500 msec. Upon determination at step S150 that the unusual state having the detection value difference ΔP of greater than the preset reference value Pref does not continue for at least the preset time period t1, the CPU 72 exits from the abnormal detection value difference identification routine.

Upon determination at step S150 that the unusual state having the detection value difference ΔP of greater than the preset reference value Pref continues for at least the preset time period t1, the CPU 72 sets an abnormality potential flag F1 to 1 (step S160). The abnormality potential flag F1 set to 1 represents that there is a potential for abnormality in the detection value difference ΔP. The CPU 72 subsequently determines whether the unusual state having the detection value difference ΔP of greater than the preset reference value Pref continues for at least a preset time period t2, which is longer than the preset time period t1 (step S170). The abnormality potential flag F1 is reset to 0, in response to an ignition-on operation according to an ignition-on state processing routine of FIG. 5 described later. The time period t2 is used as a time required for determining an abnormality of the detection value difference ΔP and is set, for example, 2 sec or 3 sec.

Upon determination at step S170 that the unusual state having the detection value difference ΔP of greater than the preset reference value Pref does not continue for at least the preset time period t2, the CPU 72 exits from the abnormal detection value difference identification routine. Upon determination at step S170 that the unusual state having the detection value difference ΔP of greater than the preset reference value Pref continues for at least the preset time period t2, on the contrary, the CPU 72 sets an abnormality determination flag F2 to 1 (step S180). The abnormality determination flag F2 set to 1 represents determination of an abnormality of the detection value difference ΔP. The CPU 72 then lights up the warning light 90 (step S190) and terminates the abnormal detection value difference identification routine. The abnormality determination flag F2 is reset to 0 as the factory default setting. Lighting up the warning light 90 notifies the driver of determination of an abnormality of the detection value difference ΔP. The determination of an abnormality of the detection value difference ΔP suggests the occurrence of some abnormality in the atmospheric pressure sensor 89 or in the intake air pressure sensor 158. In this state, a series of abnormality determination-time processing is performed, for example, to drive and control the booster circuit 55 with setting of the target voltage Vh* to a lower voltage than the voltage set to the target voltage Vh* in the state of no determination of an abnormality of the detection value difference ΔP.

Figure 4:
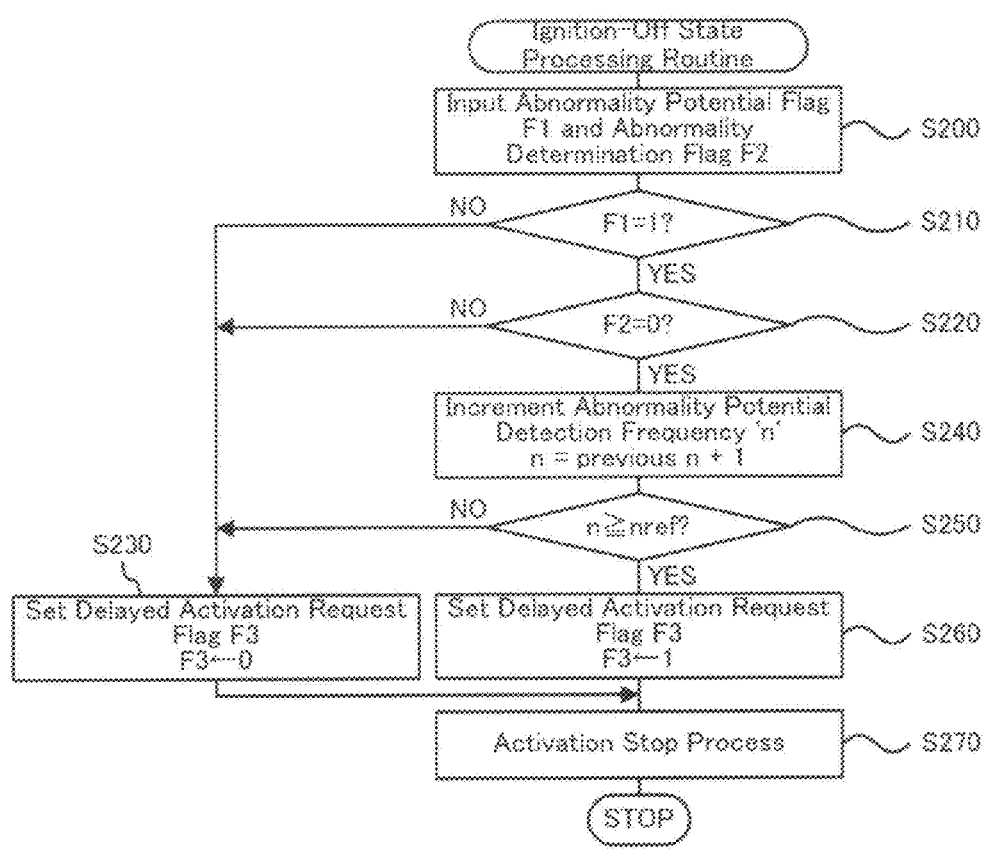
FIG. 4 is a flowchart showing an ignition-off state processing routine executed by the hybrid electronic control unit 70 in the embodiment.

As described above, the abnormal detection value difference identification routine sets the abnormality potential flag F1 to 1 (step S160) upon determination that the unusual state having the detection value difference ΔP of greater than the preset reference value Pref continues for at least the preset time period t1 (step S150). The abnormal detection value difference identification routine sets the abnormality determination flag F2 to 1 (step S180) upon determination that the unusual state having the detection value difference ΔP of greater than the preset reference value Pref continues for at least the preset time period t2 (step S170) The description regards a series of processing in an ignition-off state with the abnormality potential flag F1 and the abnormality determination flag F2. FIG. 4 is a flowchart showing an ignition-off state processing routine executed by the hybrid electronic control unit 70 in the embodiment. This routine is performed in response to an ignition-off operation.

In the ignition-off state processing routine, the CPU 72 of the hybrid electronic control unit 70 first inputs the abnormality potential flag F1 and the abnormality determination flag F2 set by the abnormal detection value difference identification routine of FIG. 4 (step S200) and checks the settings of the input abnormality potential flag F1 and the input abnormality determination flag F2 (steps S210 and S220).

When both the abnormality potential flag F1 and the abnormality determination flag F2 are equal to 0 or when both the abnormality potential flag F1 and the abnormality determination flag F2 are equal to 1 (steps S210 and S220), that is, when there is no potential for abnormality in the detection value difference ΔP or when an abnormality of the detection value difference ΔP is determined, the CPU 72 resets a delayed activation request flag F3 to 0 (step S230), performs an activation stop process of the driving system 21 (step S270), and terminates the ignition-off state processing routine. The delayed activation request flag F3 set to 1 represents the presence of a delayed activation request for delaying activation of the driving source including the engine 22 and the motors MG1 and MG2 in a subsequent ignition-on operation. The delayed activation request flag F3 reset to 0 represents the absence of the delayed activation request. The activation stop process may turn off the system main relay 56 and store the settings of the abnormality potential flag F1, the abnormality determination flag F2, and the delayed activation request flag F3 into a non-volatile memory, such as a flash memory (not shown).

When the abnormality potential flag F1 is equal to 1 at step S210 but the abnormality determination flag F2 is equal to 0 at step S220, that is, in a potential abnormality condition where there is a potential for an abnormality in the detection value difference ΔP but the abnormality of the detection value difference ΔP is not determined, the CPU 72 increments an abnormality potential detection frequency 'n' by adding a value '1' to a previous value in a previous ignition-off operation (step S240), and compares the incremented abnormality potential detection frequency 'n' with a preset reference value nref (step S250). The abnormality potential detection frequency 'n' represents a cumulative number of times when the potential abnormality condition is detected. Namely the abnormality potential detection frequency 'n' is incremented by one in response to every ignition-off operation in the potential abnormality condition. The reference value nref is used as a criterion required for confirmation of the potential abnormality condition and is set to an integer of not less than 1, for example, 4 or 5.

When the abnormality potential detection frequency 'n' is less than the preset reference value nref at step S250, the CPU 72 resets the delayed activation request flag F3 to 0 (step S230), performs the activation stop process of the driving system 21 (step S270), and terminates the ignition-off state processing routine. When the abnormality potential detection frequency 'n' is not less than the preset reference value nref at step S250, on the contrary, it is determined that the potential abnormality condition is confirmed. The CPU 72 then sets the delayed activation request flag F3 to 1 (step S260), performs the activation stop process of the driving system 21 (step S270), and terminates the ignition-off state processing routine.

Figure 5:
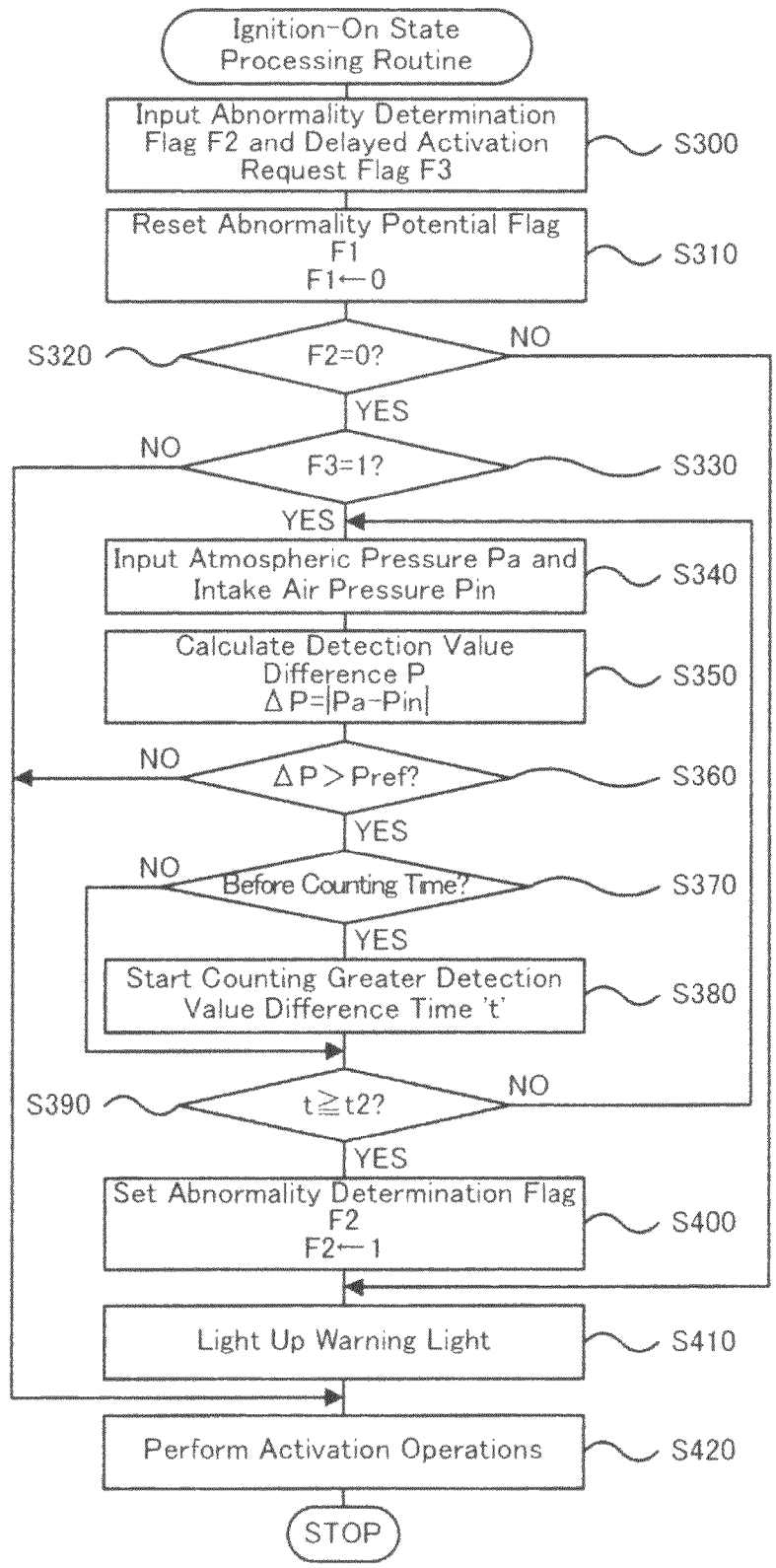
FIG. 5 is a flowchart showing an ignition-on state processing routine executed by the hybrid electronic control unit 70 in the embodiment.

The following describes a series of processing in an ignition-on state following the ignition-off state. FIG. 5 is a flowchart showing an ignition-on state processing routine executed by the hybrid electronic control unit 70 in the embodiment. This routine is performed in response to an ignition-on operation.

In the ignition-on state processing routine, the CPU 72 of the hybrid electronic control unit 70 first inputs the settings of the abnormality determination flag F2 and the delayed activation request flag F3 stored in a non-volatile memory (not shown) (step S300) and resets the abnormality potential flag F1 to 0 (step S310). The CPU 72 subsequently checks the value of the input abnormality determination flag F2 (step S320). When the abnormality determination flag F2 is equal to 0, the CPU 72 sequentially checks the value of the delayed activation request flag F3 (step S330).

When both the abnormality determination flag F2 and the delayed activation request flag F3 are equal to 0 (steps S320 and S330), that is, when there is no delayed activation request with no determination of the abnormality in the detection value difference ΔP, the CPU 72 performs a series of activation operations of the driving system 21 including a turn-on of the system main relay 56 (step S420) and exits from the ignition-on state processing routine.

When the abnormality determination flag F2 is equal to 1 at step S320, that is, upon determination of the abnormality in the detection value difference ΔP, the CPU 72 lights up the warning light 90 (step S410), performs the series of activation operations of the driving system 21 (step S420), and exits from the ignition-on state processing routine. As in the abnormality determination condition discussed above, this lighting-up operation is preferably performed in response to activation of the driving system 21 upon determination of the abnormality in the detection value difference ΔP.

When the abnormality determination flag F2 is equal to 0 at step S320 and when the delayed activation request flag F3 is equal to 1 at step S330, that is, when there is a delayed activation request with no determination of the abnormality in the detection value difference ΔP, the CPU 72 inputs the atmospheric pressure Pa and the intake air pressure Pin (step S340), calculates the absolute value of the difference between the atmospheric pressure Pa and the intake air pressure Pin as the detection value difference ΔP (step S350), and compares the calculated detection value difference ΔP with the preset reference value Pref (step S360). When the detection value difference ΔP is greater than the preset reference value Pref and when counting a greater detection value difference time 't' has not yet been started (step S370), the CPU 72 activates a timer (not shown) to start counting the greater detection value difference time 't' (step S380). The greater detection value difference time 't' represents a time duration of the state where the detection value difference ΔP is greater than the preset reference value Pref. The counted greater detection value difference time 't' is compared with the preset time period t2 (step S390). When the greater detection value difference time 't' is shorter than the preset time period t2, the ignition-on state processing routine goes back to step S340. As explained above, the throttle valve 124 opens after a stop of rotation of the engine 22. In the ignition-on state, it is generally assumed that the actual intake air pressure Pinac is substantially equal to the actual atmospheric pressure Paac. The processing of steps S350, S360, and S390 accordingly identifies whether the abnormality in the detection value difference ΔP is to be determined as in the processing of steps S130, S140, and S170 in the abnormal detection value difference identification routine of FIG. 3. As mentioned previously, the delayed activation request flag F3 is set to 1 upon confirmation of the potential abnormality condition when the abnormality potential detection frequency 'n' is not less than the preset reference value nref in the ignition-off state. The processing of steps S340 to S380 accordingly ensures the opportunity for identifying whether the abnormality in the detection value difference ΔP is to be determined.

When the detection value difference ΔP is not greater than the preset reference value Pref at step S360, it is identified that the detection value difference ΔP is normal, regardless of confirmation of the potential abnormality condition in the previous ignition-off state. The CPU 72 then performs the series of activation operations of the driving system 21 (step S420) and exits from the ignition-on state processing routine.

When the greater detection value difference time 't' is not shorter than the preset time period t2 at step S390, that is, when the unusual state having the detection value difference ΔP of greater than the preset reference value Pref continues for at least the preset time period t2, it is identified that the abnormality in the detection value difference ΔP is to be determined. The CPU 72 accordingly sets the abnormality determination flag F2 to 1 (step S400) and lights up the warning light 90 (step S410). The CPU 72 performs the series of activation operations of the driving system 21 (step S420) and exits from the ignition-on state processing routine.

In one assumed state, the hybrid vehicle 20 is driven with rotation stops of the engine 22 for relatively short time periods, for example, with relatively frequent stops and restarts of the engine 22. In this case, there may be no sufficient time for setting the abnormality determination flag F2 to 1, regardless of setting the abnormality potential flag F1 to 1 according to the abnormal detection value difference identification routine of FIG. 3. When the abnormality potential detection frequency 'n' as the cumulative number of times of detection of the potential abnormality condition reaches or exceeds the preset reference value nref in the ignition-off state, the procedure of the embodiment identifies whether the abnormality in the detection value difference ΔP is to be determined, prior to the activation operations of the driving system 21, in the subsequent ignition-on state. This arrangement ensures the opportunity for identifying whether the abnormality in the detection value difference ΔP is to be determined when there is a potential for the abnormality in the detection value difference ΔP.

As described above, the hybrid vehicle 20 of the embodiment sets the abnormality potential flag F1 to 1 and further sets the abnormality determination flag F2 to 1 according to the duration time of the unusual state having the detection value difference ΔP of greater than the preset reference value Pref in the continuous rotation stop state where the rotation stop of the engine 22 continues for at least the preset time period t0. The detection value difference ΔP is the absolute value of the difference between the detection value (atmospheric pressure Pa) of the atmospheric pressure sensor 89 and the detection value (intake air pressure Pin) of the intake air pressure sensor 158. When the abnormality potential detection frequency 'n' as the cumulative number of times of the state having the abnormality potential flag F1 equal to 1 and the abnormality determination flag F2 equal to 0 reaches or exceeds the preset reference value nref in the ignition-off state, it is determined to confirm the potential abnormality condition where there is a potential for an abnormality in the detection value difference ΔP but the abnormality in the detection value difference ΔP is not determined. In the subsequent ignition-on state, prior to the activation operations of the driving system 21, it is identified whether the abnormality in the detection value difference ΔP is to be determined. This arrangement ensures the opportunity for identifying whether the abnormality in the detection value difference ΔP is to be determined when there is a potential for the abnormality in the detection value difference ΔP.

Figure 6:
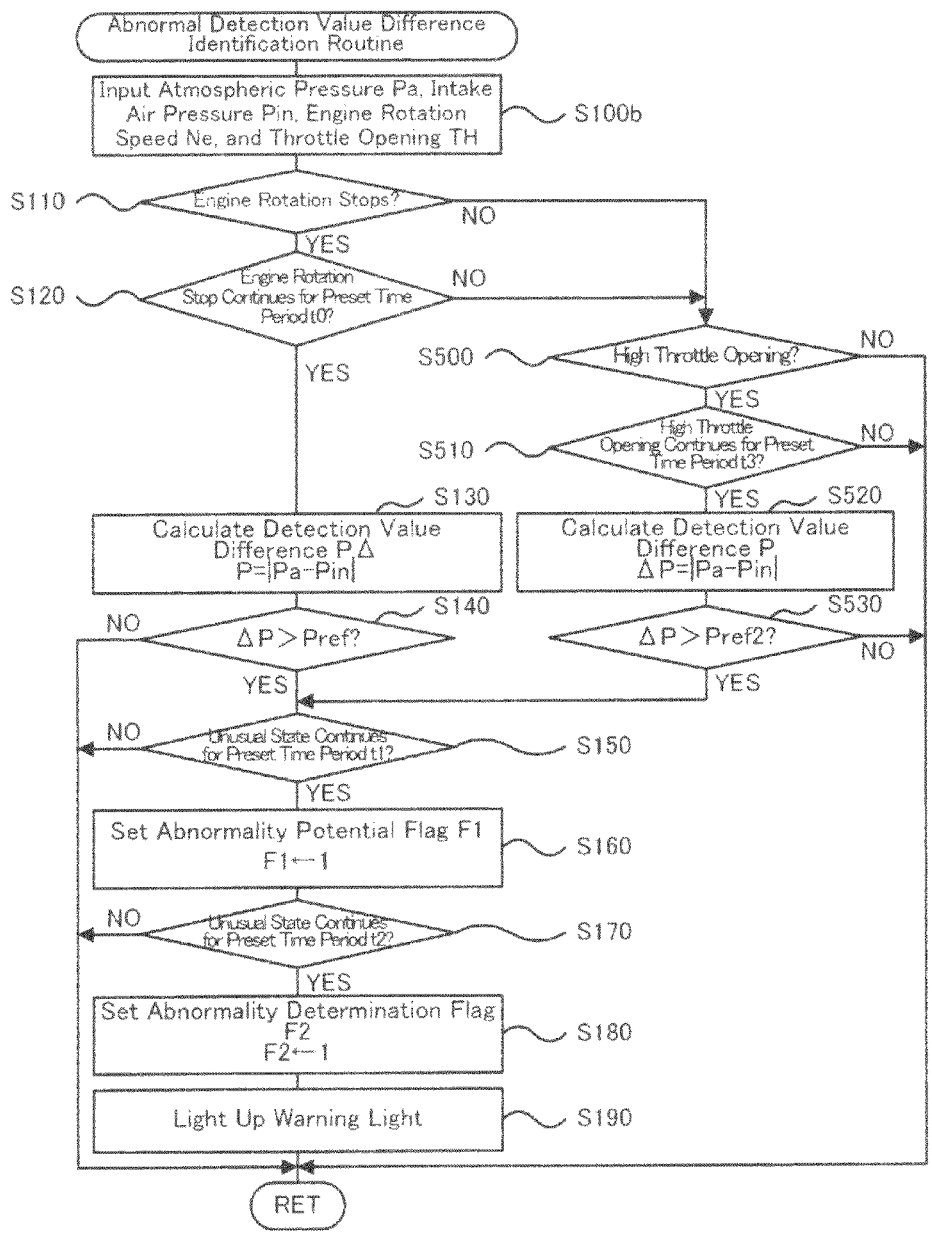
FIG. 6 is a flowchart showing a modified flow of the abnormal detection value difference identification routine executed by the hybrid electronic control unit 70 in one modified example.

The hybrid vehicle 20 of the embodiment sets the abnormality potential flag F1 to 1 and further sets the abnormality determination flag F2 to 1 according to the duration time of the unusual state having the detection value difference ΔP of greater than the preset reference value Pref in the continuous rotation stop state where the rotation stop of the engine 22 continues for at least the preset time period t0. One modification may set the abnormality potential flag F1 to 1 and further set the abnormality determination flag F2 to 1 according to the duration time of the unusual state having the detection value difference ΔP of greater than the preset reference value Pref in a continuous high throttle opening state, in addition to or in place of the continuous rotation stop state. In the continuous high throttle opening state, the throttle opening TH is not less than a preset reference opening THref for at least a preset time period t3. The time period t3 is used as a time required for making the actual intake air pressure Pinac is substantially equal to the actual atmospheric pressure Paac and is determined according to the operating condition of the engine 22 immediately before the throttle opening TH reaches or exceeds the preset reference opening THref. The reference opening THref is experimentally or otherwise determined as a lower limit of an allowable opening range where the actual intake air pressure Pinac is expected to be substantially equal to the actual atmospheric pressure Paac and is set equal to, for example, 90% or 95%. An abnormal detection value difference identification routine in this modification is shown in the flowchart of FIG. 6. The abnormal detection value difference identification routine of FIG. 6 is similar to the abnormal detection value difference identification routine of FIG. 3, except replacement of step S100 with step S100b and addition of steps S500 to S530. The equivalent processing steps are expressed by the same step numbers and are not specifically described here. In the abnormal detection value difference identification routine of FIG. 6, the CPU 72 inputs the throttle opening TH detected by the throttle valve position sensor 146 and received from the engine ECU 24 by communication, as well as the atmospheric pressure Pa, the intake air pressure Pin, and the rotation speed Ne of the engine 22 input at step S100 in the abnormal detection value difference identification routine of FIG. 3 (step S100b). Upon no determination of the continuous rotation stop state at steps S110 and S120, the CPU 72 determines whether the engine 22 is in a continuous high throttle opening state according to the input throttle opening TH (steps S500 and S510). Upon no determination of the continuous high throttle opening state, this modified processing flow immediately terminates the abnormal detection value difference identification routine. Upon determination of the continuous high throttle opening state, the CPU 72 calculates the detection value difference ΔP (step S520) in the same manner as the calculation at step S130 and compares the calculated detection value difference ΔP with a preset reference value Pref2 that is greater than the reference value Pref (step S530). When the detection value difference ΔP is not greater than the preset reference value Pref2, the CPU 72 exits from the abnormal detection value difference identification routine. When the detection value difference ΔP is greater than the preset reference value Pref2, the CPU 72 sets the abnormality potential flag F1 to 1 and may further set the abnormality determination flag F2 to 1 and light up the warning light 90 according to the duration time of the state having the detection value difference ΔP of greater than the preset reference value Pref2 (steps S150 to S190). The abnormal detection value difference identification routine is then terminated. Like the reference value Pref, the reference value Pref2 is used as a criterion for determining whether the detection value (atmospheric pressure Pa) of the atmospheric pressure sensor 89 and the detection value (intake air pressure Pin) of the intake air pressure sensor 158 are normal (within an allowable error range) and is determined according to the detection accuracies of the atmospheric pressure sensor 89 and the intake air pressure sensor 158. The reference value Pref2 used in the continuous high throttle opening state is greater than the reference value Pref used in the continuous rotation stop state, because of the following reason. The engine 22 is driven in the continuous high throttle opening state. A slight variation in operating condition of the engine 22, for example, a slight variation in throttle opening TH, leads to a change in detection value (intake air pressure Pin) of the intake air pressure sensor 158. In this manner, the abnormality potential flag F1 and the abnormality determination flag F2 may be set to 1 in the continuous high throttle opening state. This modified procedure increases the opportunity for setting the abnormality potential flag F1 and the abnormality determination flag F2 to 1, compared with the procedure of setting the abnormality potential flag F1 and the abnormality determination flag F2 only in the continuous rotation stop state.

Upon confirmation of the potential abnormality condition where there is a potential for an abnormality in the detection value difference ΔP but the abnormality in the detection value difference ΔP is not determined, the hybrid vehicle 20 of the embodiment identifies whether the abnormality in the detection value difference ΔP is to be determined prior to the activation operations of the driving system 21 in the subsequent ignition-on state. In one modification, it may be identified whether the abnormality in the detection value difference ΔP is to be determined in the rotation stop condition of the engine 22 (before a restart of the engine 22) even after a start of the activation operations of the driving system 21.

Upon confirmation of the potential abnormality condition where there is a potential for an abnormality in the detection value difference ΔP but the abnormality in the detection value difference ΔP is not determined, the hybrid vehicle 20 of the embodiment identifies whether the abnormality in the detection value difference ΔP is to be determined prior to the activation operations of the driving system 21 in the subsequent ignition-on state. It may be identified whether the abnormality in the detection value difference ΔP is to be determined at any time after an ignition-off operation (an activation stop instruction of the driving system 21). For example, it may be identified whether the abnormality in the detection value difference ΔP is to be determined as part of the activation stop process of the driving system 21.

In the hybrid vehicle 20 of the embodiment, the settings of the abnormality potential flag F1, the abnormality determination flag F2, and the delayed activation request flag F3 are stored in the non-volatile memory (for example, a flash memory) in the activation stop process of the driving system 21. The settings of the abnormality potential flag F1, the abnormality determination flag F2, and the delayed activation request flag F3 may be stored in any storage medium that keeps the stored data even after the ignition-off. For example, the settings of the abnormality potential flag F1, the abnormality determination flag F2, and the delayed activation request flag F3 may be stored in a RAM of a power supply electronic control unit (not shown) that receives a supply of electric power from an auxiliary machinery battery (not shown) even after the ignition-off.

The hybrid vehicle 20 of the embodiment is equipped with the booster circuit 55. The booster circuit 55 is, however, not essential but may be omitted when not required.

Figure 7:
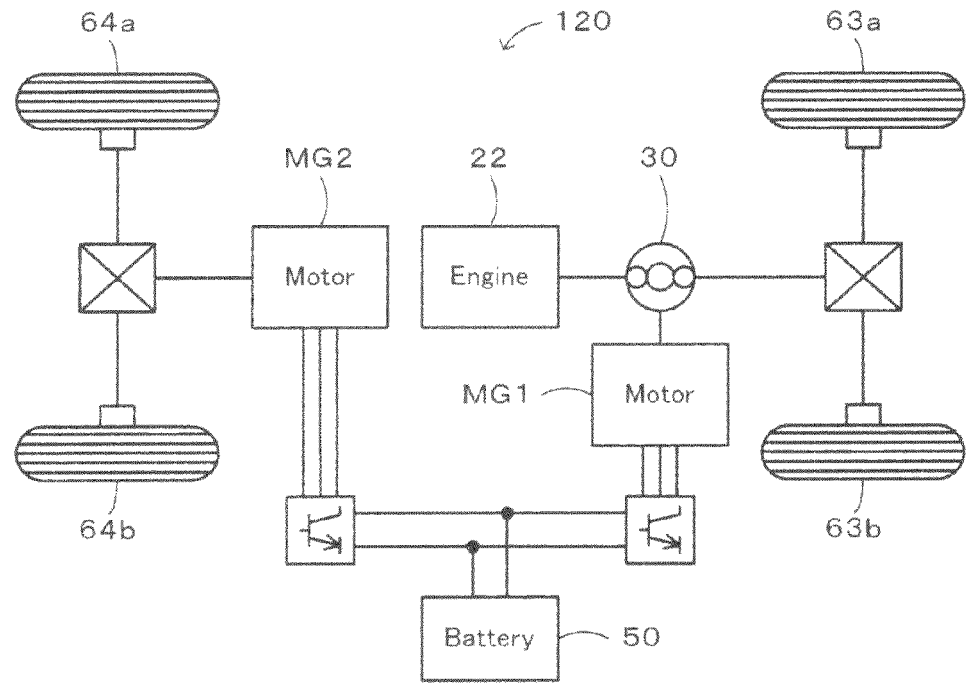
FIG. 7 schematically illustrates the configuration of another hybrid vehicle 120 in one modified example.

In the hybrid vehicle 20 of the embodiment, the power of the motor MG2 is converted by the reduction gear 35 and is output to the ring gear shaft 32a. The technique of the invention is also applicable to a hybrid vehicle 120 of a modified structure shown in FIG. 7. In the hybrid vehicle 120 of FIG. 7, the power of the motor MG2 is connected to another axle (an axle linked with wheels 64a and 64b) that is different from the axle connecting with the ring gear shaft 32a (the axle linked with the drive wheels 63a and 63b).

Figure 8:
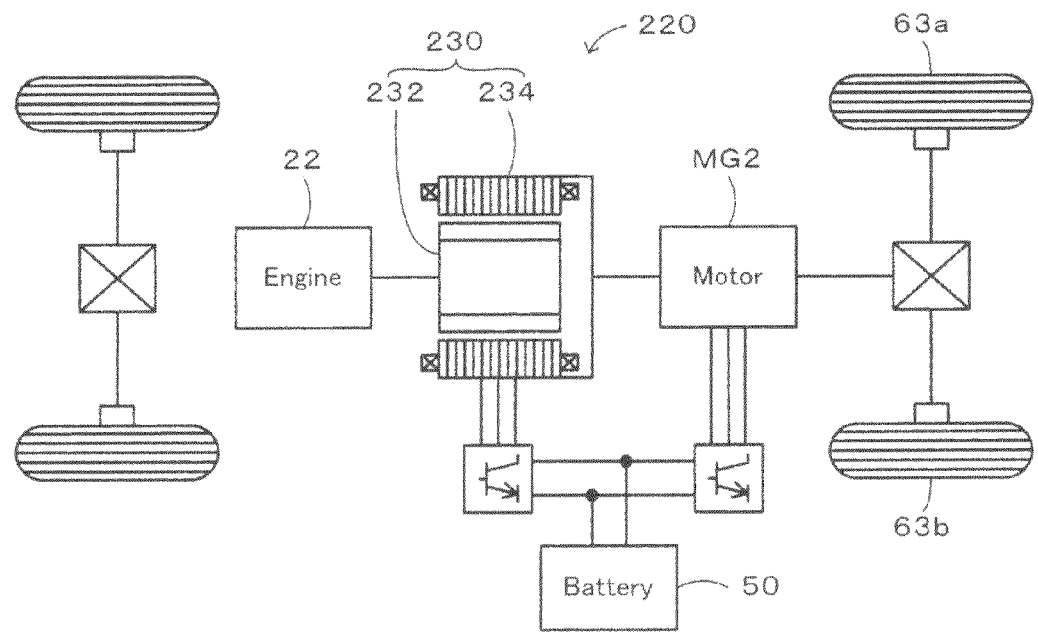
FIG. 8 schematically illustrates the configuration of still another hybrid vehicle 220 in another modified example.

In the hybrid vehicle 20 of the embodiment, the power of the engine 22 is output via the power distribution integration mechanism 30 to the ring gear shaft 32a or the driveshaft linked with the drive wheels 63a and 63b. The technique of the invention is also applicable to a hybrid vehicle 220 of another modified structure shown in FIG. 8. The hybrid vehicle 220 of FIG. 8 is equipped with a pair-rotor motor 230. The pair-rotor motor 230 includes an inner rotor 232 connected to the crankshaft 26 of the engine 22 and an outer rotor 234 connected to a driveshaft for outputting power to the drive wheels 63a and 63b. The pair-rotor motor 230 transmits part of the output power of the engine 22 to the driveshaft, while converting the residual engine output power into electric power.

The abnormal detection value difference identification routine, the ignition-off state processing routine, and the ignition-on state processing routine described above are executable in any structure equipped with a drive assembly constructed to include an internal combustion engine and a motor and to output power to a driveshaft with intermittent operation of the internal combustion engine, an atmospheric pressure detector, and an intake air pressure detector. The technique of the invention may thus be actualized by a driving system mounted on various moving bodies including motor vehicles, other vehicles, boats and ships, and aircraft, as well as by a driving system incorporated in stationary equipment, such as construction machinery. Another application of the invention is a control method of such a driving system.

The primary elements in the embodiment and its modified examples are mapped to the primary constituents in the claims of the invention as described below. The combination of the engine 22, the power distribution integration mechanism 30, the motors MG1 and MG2, the booster circuit 55, and the battery 50 in the embodiment is equivalent to the 'drive assembly' in the claims of the invention. The atmospheric pressure sensor 89 and the intake air pressure sensor 158 of the embodiment respectively correspond to the 'atmospheric pressure detector' and the 'intake air pressure detector' in the claims of the invention. The hybrid electronic control unit 70 executing the processing of steps S110 to S160 in the abnormal detection value difference identification routine of FIG. 3 in the embodiment is equivalent to the 'abnormality potential estimation module' in the claims of the invention. The processing of steps S110 to S160 in the abnormal detection value difference identification routine of FIG. 3 calculates the detection value difference ΔP as the absolute value of the difference between the detection value (atmospheric pressure Pa) of the atmospheric pressure sensor 89 and the detection value (intake air pressure Pin) of the intake air pressure sensor 158 in the continuous rotation stop state where the rotation stop of the engine 22 continues for at least the preset time period t0, and sets the abnormality potential flag F1 to 1 in response to duration of the unusual state having the detection value difference ΔP of greater than the preset reference value Pref for at least the preset time period t1. The hybrid electronic control unit 70 executing the processing of steps S170 and S180 in the abnormal detection value difference identification routine of FIG. 3 in the embodiment is equivalent to the 'abnormality determination module' in the claims of the invention. The processing of steps S170 and S180 in the abnormal detection value difference identification routine of FIG. 3 sets the abnormality determination flag F2 to 1 in response to duration of the unusual state having the detection value difference ΔP of greater than the preset reference value Pref for at least the preset time period t2 in the continuous rotation stop state. The hybrid electronic control unit 70 executing the ignition-off state processing routine of FIG. 4 and the ignition-on state processing routine of FIG. 5 in the embodiment is equivalent to the 'unusual state duration identification module' in the claims of the invention. The ignition-off state processing routine of FIG. 4 sets the delayed activation request flag F3 to 1 in response to confirmation of the potential abnormality condition where there is a potential for an abnormality in the detection value difference ΔP but the abnormality of the detection value difference ΔP is not determined, when the abnormality potential detection frequency 'n' as the cumulative number of times of detection of the settings of the abnormality potential flag F1 to 1 and the abnormality determination flag F2 to 0 reaches or exceeds the preset reference value nref in the ignition-off state. The ignition-on state processing routine of FIG. 5 determines whether the unusual state having the detection value difference ΔP of greater than the preset reference value Pref continues for at least the preset time period t2, prior to the activation operations of the driving system 21, when the delayed activation request flag F3 is equal to 1 in the ignition-on state. The engine 22, the motor MG2, the battery 50, and the booster circuit 55 of the embodiment respectively correspond to the 'internal combustion engine', the 'motor', the 'accumulator', and the 'high voltage-system voltage regulator' in the claims of the invention. The hybrid electronic control unit 70 setting the target voltage Vh* to a specific voltage based on the torques output from the motors MG1 and MG2 and the atmospheric pressure Pa and driving and controlling the booster circuit 55 with the set target voltage Vh* upon no determination of the abnormality in the detection value difference ΔP while setting the target voltage Vh* to a lower voltage than the specific voltage and driving and controlling the booster circuit 55 with the set target voltage Vh* upon determination of the abnormality in the detection value difference ΔP in the embodiment is equivalent to the 'booster controller' in the claims of the invention. The combination of the power distribution integration mechanism 30 with the motor MG1 in the embodiment or the pair-rotor motor 230 of the modified example is equivalent to the 'electric power-mechanical power input output assembly' in the claims of the invention. The motor MG1 and the power distribution integration mechanism 30 of the embodiment respectively correspond to the 'generator' and the 'three shaft-type power input output structure' in the claims of the invention.

The 'drive assembly' is not restricted to the combination of the engine 22, the power distribution integration mechanism 30, the motors MG1 and MG2, the booster circuit 55, and the battery 50 but may be any structure having an internal combustion engine and a motor and enabling output of power to a driveshaft with intermittent operation of the internal combustion engine, for example, a structure with omission of the power distribution integration mechanism 30 and the motor MG1, a structure with omission of the booster circuit 55, or a structure including the pair-rotor motor 230 in place of the motor MG1 and the power distribution integration mechanism 30. The 'atmospheric pressure detector' is not restricted to the atmospheric pressure sensor 89 but may be any structure enabling detection of the atmospheric pressure, for example, a structure computing the atmospheric pressure Pa from a signal of a sensor that measures a specified physical amount relating to the atmospheric pressure. The 'intake air pressure detector' is not restricted to the intake air pressure sensor 158 but may be any structure enabling detection of the intake air pressure, for example, a structure computing the intake air pressure Pin from a signal of a sensor that measures a specified physical amount relating to the intake air pressure. The 'abnormality potential estimation module' is not restricted to the configuration of calculating the detection value difference ΔP as the absolute value of the difference between the detection value (atmospheric pressure Pa) of the atmospheric pressure sensor 89 and the detection value (intake air pressure Pin) of the intake air pressure sensor 158 in the continuous rotation stop state where the rotation stop of the engine 22 continues for at least the preset time period t0, and setting the abnormality potential flag F1 to 1 in response to duration of the unusual state having the detection value difference ΔP of greater than the preset reference value Pref for at least the preset time period t1. The 'abnormality potential estimation module' may be any configuration of estimating a potential for abnormality of a detection value difference, which is a difference between an observed atmospheric pressure as the atmospheric pressure detected by the atmospheric pressure detector and an observed intake air pressure as the intake air pressure detected by the intake air pressure detector, when an unusual state, in which the detection value difference is greater than a preset reference value, continues for at least a preset first time period in an isobaric condition where the intake air pressure is substantially equal to the atmospheric pressure. The 'abnormality determination module' is not restricted to the configuration of setting the abnormality determination flag F2 to 1 in response to duration of the unusual state having the detection value difference ΔP of greater than the preset reference value Pref for at least the preset time period t2 in the continuous rotation stop state. The 'abnormality determination module' may be any configuration of determining an abnormality of the detection value difference when the unusual state continues for at least a preset second time period, which is longer than the preset first time period. The 'unusual state duration identification module' is not restricted to the configuration of setting the delayed activation request flag F3 to 1 in response to confirmation of the potential abnormality condition where there is a potential for an abnormality in the detection value difference ΔP but the abnormality of the detection value difference ΔP is not determined, when the abnormality potential detection frequency 'n' as the cumulative number of times of detection of the settings of the abnormality potential flag F1 to 1 and the abnormality determination flag F2 to 0 reaches or exceeds the preset reference value nref in the ignition-off state and of determining whether the unusual state having the detection value difference ΔP of greater than the preset reference value Pref continues for at least the preset time period t2, prior to the activation operations of the driving system 21, when the delayed activation request flag F3 is equal to 1 in the ignition-on state. The 'unusual state duration identification module' may be any configuration of determining whether the unusual state continues for at least the preset second time period prior to a restart of the internal combustion engine after an activation stop instruction of the driving system, upon confirmation of a potential abnormality condition where the potential for abnormality of the detection value difference is estimated but the abnormality of the detection value difference is not determined. The 'internal combustion engine' is not restricted to the internal combustion engine designed to consume a hydrocarbon fuel, such as gasoline or light oil, and thereby output power, but may be an internal combustion engine of any other design, for example, a hydrogen engine. The 'motor' is not restricted to the motor MG2 constructed as a synchronous motor generator but may be any type of motor designed to input and output power from and to the driveshaft, for example, an induction motor. The accumulator' is not restricted to the battery 50 as a secondary battery but may be a capacitor or any other storage unit arranged to transmit electric power to and from the electric power-mechanical power input output assembly and the motor. The 'high voltage-system voltage regulator' is not restricted to the booster circuit 55 but may be any other structure linked to a low voltage system connecting with the accumulator and to a high voltage system connecting with a driving circuit of the motor and configured to regulate a voltage in the high voltage system. The 'electric power-mechanical power input output assembly' is not restricted to the combination of the power distribution integration mechanism 30 with the motor MG1 or to the pair-rotor motor 230 but may be any structure connected with a driveshaft linked to an axle of the vehicle and with an output shaft of the internal combustion engine in such a manner as to be rotatable independently of the driveshaft and configured to input and output power to and from the driveshaft and the output shaft through input and output of electric power and mechanical power. The 'generator' is not restricted to the motor MG1 constructed as a synchronous motor generator but may be any type of generator designed to input and output power, for example, an induction motor. The 'three shaft-type power input output structure' is not restricted to the power distribution integration mechanism 30 but may be any structure connected to three shafts, the driveshaft, the output shaft of the internal combustion engine, and a rotating shaft of the generator, and designed to input and output power to a residual shaft based on powers input from and output to any two shafts among the three shafts, for example, a structure adopting a double pinion-type planetary gear mechanism, a structure connected to four or a greater number of shafts by combination of multiple planetary gear mechanisms, or a structure adopting a differential gear or another differential motion mechanism other than the planetary gear mechanism.

The above mapping of the primary elements in the embodiment and its modified examples to the primary constituents in the claims of the invention is not restrictive in any sense but is only illustrative for concretely describing the modes of carrying out the invention. Namely the embodiment and its modified examples discussed above are to be considered in all aspects as illustrative and not restrictive.

There may be many other modifications, changes, and alterations without departing from the scope or spirit of the main characteristics of the present invention.

The disclosure of Japanese Patent Application No. 2008-020594 filed Jan. 31, 2008 including specification, drawings and claims is incorporated herein by reference in its entirety.

What is claimed is:

1. A driving system, comprising:
  a drive assembly constructed to include an internal combustion engine and a motor and to output power to a driveshaft with intermittent operation of the internal combustion engine;
  an atmospheric pressure detector designed to detect an atmospheric pressure;
  an intake air pressure detector designed to detect an intake air pressure or a pressure of intake air of the internal combustion engine;
  an abnormality potential estimation module configured to estimate a potential for abnormality of a detection value difference, which is a difference between an observed atmospheric pressure as the atmospheric pressure detected by the atmospheric pressure detector and an observed intake air pressure as the intake air pressure detected by the intake air pressure detector, when an unusual state, in which the detection value difference is greater than a preset reference value, continues for at least a preset first time period in an isobaric condition where the intake air pressure is substantially equal to the atmospheric pressure;
  an abnormality determination module configured to determine an abnormality of the detection value difference when the unusual state continues for at least a preset second time period, which is longer than the preset first time period; and
  an unusual state duration identification module configured to determine whether the unusual state continues for at least the preset second time period prior to a restart of the internal combustion engine after an activation stop instruction of the driving system, upon confirmation of a potential abnormality condition where the potential for abnormality of the detection value difference is estimated by the abnormality potential estimation module but the abnormality of the detection value difference is not determined by the abnormality determination module.

2. The driving system in accordance with claim 1, wherein upon confirmation of the potential abnormality condition, the unusual state duration identification module determines whether the unusual state continues for at least the preset second time period prior to activation of the driving system, in response to a system activation instruction after an activation stop of the driving system.

3. The driving system in accordance with claim 1, wherein upon confirmation of the potential abnormality condition, the unusual state duration identification module determines whether the unusual state continues for at least the preset second time period at an activation stop time of the driving system.

4. The driving system in accordance with claim 1, wherein the unusual state duration identification module confirms the potential abnormality condition in response to detection of the potential abnormality condition at least a preset number of times.

5. The driving system in accordance with claim 1, wherein the isobaric condition is either a continuous rotation stop state where rotation of the internal combustion engine stops for at least a preset third time period or a continuous high throttle opening state where a throttle opening of the internal combustion engine is within a predetermined high throttle opening range for at least a preset fourth time period.

6. The driving system in accordance with claim 5, wherein the reference value is set to a larger value in the continuous high throttle opening state than a set value in the continuous rotation stop state.

7. The driving system in accordance with claim 1, wherein the drive assembly further includes an accumulator and a high voltage-system voltage regulator linked to a low voltage system connecting with the accumulator and to a high voltage system connecting with a driving circuit of the motor and configured to regulate a voltage in the high voltage system,
  the driving system further having:
    a booster controller configured to control the high voltage-system voltage regulator upon no determination of the abnormality of the detection value difference by the abnormality determination module, in order to regulate the voltage in the high voltage system to a specific voltage based on the observed atmospheric pressure, and to control the high voltage-system voltage regulator upon determination of the abnormality of the detection value difference by the abnormality determination module, in order to regulate the voltage in the high voltage system to a lower voltage that is less than the specific voltage.

8. The driving system in accordance with claim 1, wherein the drive assembly further includes an electric power-mechanical power input output assembly connected with the driveshaft and with an output shaft of the internal combustion engine in such a manner as to be rotatable independently of the driveshaft and configured to input and output power to and from the driveshaft and the output shaft through input and output of electric power and mechanical power.

9. The driving system in accordance with claim 8, wherein the electric power-mechanical power input output assembly has:
  a generator designed to input and output power; and
  a three shaft-type power input output structure connected to three shafts, the driveshaft, the output shaft of the internal combustion engine, and a rotating shaft of the generator, and designed to input and output power to a residual shaft based on powers input from and output to any two shafts among the three shafts.

10. A vehicle, comprising:
  a drive assembly constructed to include an internal combustion engine and a motor and to output power to a driveshaft linked to an axle of the vehicle with intermittent operation of the internal combustion engine;

an atmospheric pressure detector designed to detect an atmospheric pressure;

an intake air pressure detector designed to detect an intake air pressure or a pressure of intake air of the internal combustion engine;

an abnormality potential estimation module configured to estimate a potential for abnormality of a detection value difference, which is a difference between an observed atmospheric pressure as the atmospheric pressure detected by the atmospheric pressure detector and an observed intake air pressure as the intake air pressure detected by the intake air pressure detector, when an unusual state, in which the detection value difference is greater than a preset reference value, continues for at least a preset first time period in an isobaric condition where the intake air pressure is substantially equal to the atmospheric pressure;

an abnormality determination module configured to determine an abnormality of the detection value difference when the unusual state continues for at least a preset second time period, which is longer than the preset first time period; and an unusual state duration identification module configured to determine whether the unusual state continues for at least the preset second time period prior to a restart of the internal combustion engine after an activation stop instruction of a driving system of the vehicle, upon confirmation of a potential abnormality condition where the potential for abnormality of the detection value difference is estimated by the abnormality potential estimation module but the abnormality of the detection value difference is not determined by the abnormality determination module.

11. A control method of a driving system, where the driving system includes: a drive assembly constructed to include an internal combustion engine and a motor and to output power to a driveshaft with intermittent operation of the internal combustion engine; an atmospheric pressure detector designed to detect an atmospheric pressure; and an intake air pressure detector designed to detect an intake air pressure or a pressure of intake air of the internal combustion engine, the control method comprising the steps of:

(a) estimating a potential for abnormality of a detection value difference, which is a difference between an observed atmospheric pressure as the atmospheric pressure detected by the atmospheric pressure detector and an observed intake air pressure as the intake air pressure detected by the intake air pressure detector, when an unusual state, in which the detection value difference is greater than a preset reference value, continues for at least a preset first time period in an isobaric condition where the intake air pressure is substantially equal to the atmospheric pressure;

(b) determining an abnormality of the detection value difference when the unusual state continues for at least a preset second time period, which is longer than the preset first time period; and (c) determining whether the unusual state continues for at least the preset second time period prior to a restart of the internal combustion engine after an activation stop instruction of the driving system, upon confirmation of a potential abnormality condition where the potential for abnormality of the detection value difference is estimated in the step (a) but the abnormality of the detection value difference is not determined in the step (b).

12. The control method of the driving system in accordance with claim 11, wherein upon confirmation of the potential abnormality condition, the step (c) determines whether the unusual state continues for at least the preset second time period prior to activation of the driving system, in response to a system activation instruction after an activation stop of the driving system.

13. The control method of the driving system in accordance with claim 11, wherein upon confirmation of the potential abnormality condition, the step (c) determines whether the unusual state continues for at least the preset second time period at an activation stop time of the driving system.

14. The control method of the driving system in accordance with claim 11, wherein the step (c) confirms the potential abnormality condition in response to detection of the potential abnormality condition at least a preset number of times.

* * * * *